United States Patent
Israelsson et al.

(10) Patent No.: US 8,155,647 B2
(45) Date of Patent: Apr. 10, 2012

(54) METHOD AND APPARATUS FOR AUTOMATICALLY DETERMINING NEIGHBOR CELLS IN A WIRELESS TELECOMMUNICATION SYSTEM

(75) Inventors: Martin Israelsson, Spånga (SE);
Mattias Wahlqvist, Madrid (ES); Mats Buchmayer, Stockholm (SE); Anders Dahlén, Västerhaninge (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 773 days.

(21) Appl. No.: 12/261,895

(22) Filed: Oct. 30, 2008

(65) Prior Publication Data
US 2009/0117897 A1    May 7, 2009

Related U.S. Application Data

(60) Provisional application No. 60/984,120, filed on Oct. 31, 2007.

(51) Int. Cl.
*H04W 4/00* (2009.01)
(52) U.S. Cl. ......... 455/434; 370/255; 370/254; 370/338

(58) Field of Classification Search ............ 455/434
See application file for complete search history.

(56) References Cited

U.S. PATENT DOCUMENTS
2008/0311914 A1 * 12/2008  Tinnakornsrisuphap et al. ............... 455/436

* cited by examiner

*Primary Examiner* — Nick Corsaro
*Assistant Examiner* — Gerald Johnson

(57) ABSTRACT

Methods and apparatuses for automatically determining neighbor cells are disclosed. Cell information is received. The received cell information is compared with a list of old neighbor cells. When a new cell is detected, a determination is made as to whether the detected new cell covers the same geographical area as any of the old neighbor cells. When the new cell covers the same geographical area as at least one of the cells of the list, the new cell is stored as a neighbor cell in the list. Cell information is received. The received cell information is compared with a list of old neighbor cells. New neighbors are detected based on the comparison. A determination is made as to whether there are cells in a same geographic area as the new neighbors. A determination is made as to whether there are new cells in a same geographic area as the old neighbor cells. The new neighbors, the cells in the same geographic area as the new neighbors, and the new cells are stored as neighbors in the list.

11 Claims, 4 Drawing Sheets

METHOD AND APPARATUS FOR AUTOMATICALLY DETERMINING NEIGHBOR CELLS IN A WIRELESS TELECOMMUNICATION SYSTEM

CROSS-REFERENCE TO RELATED APPLICATIONS

This application claims the benefit of U.S. Provisional Application No. 60/984,120, filed Oct. 31, 2007, the disclosure of which is incorporated herein by reference.

BACKGROUND

The present invention relates to a method and arrangement in a telecommunications system, in particular it relates to a method and apparatus for automatically determining neighbor cells in a wireless telecommunication system.

For LTE (Long Term Evolution) telecommunication systems the concept self organizing network is currently being developed. At X2 setup, information about cells served under an eNB (evolved Node B), sometimes called base station or radio-base-station, is mutually exchanged. After that there is a procedure to determine which cells are actually neighboring cells.

The eNBs are usually interconnected with each other by means of an X2 interface. It is assumed that there always exist an X2 interface between the eNBs that need to communicate with each other, e.g. for support of handover of UEs in LTE_ACTIVE. The eNBs are also connected by means of the S1 interface to the EPC (Evolved Packet Core). The S1 interface supports a many-to-many relation between aGWs (Access Gateways) and eNBs. It should be noted that other interfaces may be used for the communication between the eNBs other than the X2 interface.

Currently a cell is defined a neighboring cell if it is manually configured and stored as a white listed cell, or if it is discovered by the ANRL (Automatic Neighbor Relation) function, i.e., a UE (User Equipment), sometimes also called mobile station or mobile terminal, finds the cell while performing measurements in active state.

One problem with waiting for a UE to perform measurements in order to find neighboring cells is that a UE will normally not measure on inter frequency or inter-RAT cells unless explicitly informed to do so by the eNB. The UE will need measurements gaps to do so and the gaps imply performance loss. Another problem is that the eNB might not be aware of which neighbor frequencies it shall request UEs to perform interfrequency measurements.

Therefore there is a need in the art to provide a solution that alleviates the above indicated problems.

SUMMARY

Methods and apparatuses for automatically determining neighbor cells is disclosed. In one embodiment, at least one of cell information from a neighboring base station and cell information from a mobile terminal of a cell served by the first base station is received. The received cell information is compared with a list of old neighbor cells stored in the first base station. When a new cell is detected, a determination is made as to whether the detected new cell covers the same geographical area as any of the old neighbor cells. When the new cell covers the same geographical area as at least one of the cells of the list, the new cell is stored as a neighbor cell in the list.

In another embodiment, at least one of cell information from a neighboring base station and cell information from a mobile terminal of a cell served by the first base station is received. The received cell information is compared with a list of neighbor cells stored in the first base station as old neighbor cells. New neighbors are detected based on the comparison. A determination is made as to whether there are cells in a same geographic area as the new neighbors. A determination is made as to whether there are new cells in a same geographic area as the old neighbor cells. The new neighbors, the cells in the same geographic area as the new neighbors, and the new cells are stored as neighbors in the list.

BRIEF DESCRIPTION OF THE DRAWINGS

In the following section, the invention will be described with reference to exemplary embodiments illustrated in the figures, in which.

DETAILED DESCRIPTION

Abbreviations

Figure 1:
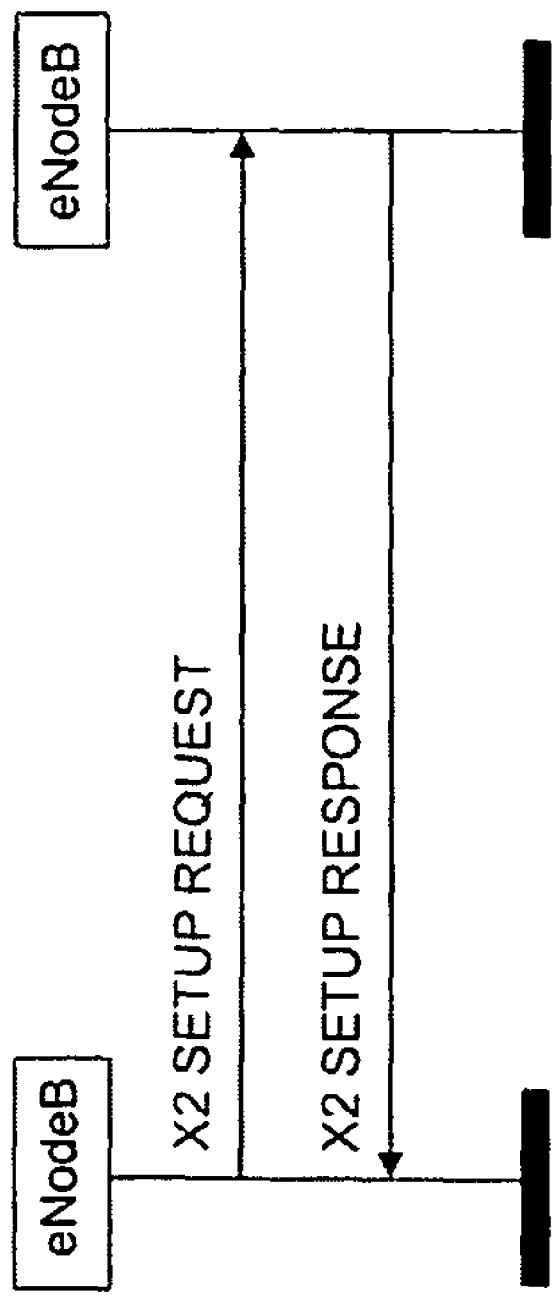
FIG. 1 schematically illustrates an X2 interface setup between base stations for exchanging lists with cell information in an LTE system according to one embodiment.

ANRL Automatic Neighbor Relation
eNB Enhanced Node B
LTE Long Term Evolution
MCI Measurement Cell Identity
PLMN Public Land Mobile Network
RAT Radio Access Technology
TAC Tracking Area Code
UE User Equipment In the following, various embodiments of the invention will be described.

It is an object of the present invention to provide a solution for automatic listing of neighboring cells in a communications system that at least to a certain extent alleviates some of the problems indicated above.

It is also an object of the present invention to provide an automatic procedure to list all cells that covers the same area as neighbors when only one of them is configured as neighbor or only one of them is discovered as neighbor in ANRL.

It is furthermore an object of the present invention to provide an ANRL function that to a large extent is able to find neighboring cells on other frequencies without the need to perform UE measurements more than on intra-frequency cells.

Manual configuration time is saved since intra-frequency neighbors are specified in the white list and the system automatically finds inter-frequency cells having the same coverage area and stores the inter-frequency cells as neighbors.

A first aspect of the present invention relates to a method in a radio base station, also called a first base station, of a wireless communication system for listing of cells as neighbor cells if found covering the same geographical area as cells of a list of served cells stored in the first base station and configured therein as neighbor cells.

A first method step of the first aspect of the invention involves receiving at least one of cell information from a neighboring base station and cell information from a mobile terminal of a cell served by the first base station. In a second step the received cell information is then compared with the cell information of the cells of the list stored in the first base station for detecting possible new cells. If a new cell is detected, a step three further involves determining, also based on the comparison, if the detected new cell covers the same geographical area as any of the cells listed in the first base station as neighbor cells. If the new cell is then found covering the same geographical area as a cell of the list, i.e. a so-called old cell, a forth method step comprises to store the new cell as a neighbor cell in the list. The neighboring cell information provided by the list is thereby updated in the first base station without having to perform any inter-frequency measurements.

According to one embodiment of this aspect of the invention, the terminal cell information directly identifies a new neighbor cell to be stored as such in the base station list and further comprises:

comparing the cell information of the neighboring base station with the cell information of the terminal, e.g. UE, for detecting new cells, and if a new cell is detected, determining, based on the comparison, if the new cell covers the same geographical area as the new neighbor cell of the terminal, and if the new cell is found covering the same geographical area as the terminal neighbor cell, storing both of the new cell and the terminal neighbor cell as a respective neighbor cell in the list.

According to another embodiment of this aspect of the invention, the terminal cell information is provided through an intra-frequency function for detecting new neighbor cells, such as an Automatic Neighbor Relation (ANRL) function or the like function for detecting new neighbor cells.

According to a further embodiment of this aspect of the invention, the cell information of the first base station and neighbor base station respectively comprises a list of served cells and at least one of configuration data for each served cell and an area sector reference for each cell. Cell information is exchanged between base stations. In the signaling, cells are grouped together based on which area they cover, e.g. cells that use the same sector may be grouped together, or an explicit area or sector reference is indicated per cell.

According to yet another embodiment of this aspect of the invention, the terminal cell information comprises at least one of configuration data and area sector reference for the new neighbor cell identified by the terminal.

According to yet a further embodiment of this aspect of the invention, the configuration data comprises at least one of physical layer cell identity, frequency and global cell identity.

In another embodiment of this aspect of the invention, the determining of same geographical area involves matching the area sector reference for said new cell with the area sector reference of at least one of the cells of said list or with the area sector reference of said terminal neighbor cell for correspondence.

In another embodiment, a new neighbor cell is identified by terminal. The cell information of the neighboring base station is compared with the cell information of the terminal for detecting new cells. When a new cell is detected, it is determined, based on the comparison, whether any cell in the cell information of the neighboring base station covers the same geographical area as the new neighbor cell of the terminal. All cells that cover the same geographical area as the terminal neighbor cell are stored as neighbor cells in the list, including the neighbor cell of the terminal.

A second aspect of the present invention relates to a base station of a wireless communication system capable of automatic listing as neighbor cells of cells that cover the same geographical area as cells of a list of cells served by the base station and configured as neighbor cells therein. The base station to this end comprises means arranged to perform method steps of the first aspect of the invention.

The present invention according to the aspects and embodiments thereof herein described provides the advantage that neighboring cells that cover the same area as an intra-frequency cell discovered by ANRL function can all be listed as neighboring cells automatically, without performing any inter-frequency measurements. Furthermore, only intra-frequency neighbors needs to be configured in the white list for the system to automatically find inter-frequency cells with same coverage area and to store them as neighbors as well.

The features described above in relation to the method according to the invention may, where applicable, also be implemented in an arrangement according to the invention with the same advantages as described in relation to the method.

The above aspects of the invention may be combined in the same embodiment. In the following, embodiments of the invention will be described with reference to the drawings.

FIG. 1 illustrates an X2 setup procedure. Briefly described, the present invention involves a method and arrangement adapted to provide a procedure to automatically list all cells that cover the same area as neighbors when only one or a few of them is configured as neighbor in a base station or only one of them is discovered as neighbor in ANRL.

A first step to solve the problem described above would be that the cell information exchanged between eNBs at e.g. X2 setup exemplified schematically in FIG. 1 is grouped together based on which area they cover, e.g. cells that use the same sector may be grouped together. The exchange of potential neighbor cell information as well as the inter-frequency neighbors is then provided in the initial setup of X2 application layer.

The initiating or first base station, i.e. eNodeB, transfers a list of served cells, including the configuration data of each cell, to the candidate or neighboring base eNodeB. The candidate eNodeB may then reply with a list of its served cells, including the configuration data of each cell. The configuration data will be Physical layer cell identity (also called Measurement Cell Identity, MCI [3]), frequency and Global cell identity, i.e. a cell identity that is unique within a PLMN and becomes globally unique together with PLMN Identity and Cell identity.

This provides the advantage of enabling the eNodeBs to cache the cell relations and reduce the effort in subsequent X2, or the like eNodeB-to-eNodeB, related signaling, e.g. adding neighboring cell relations and finding appropriate target eNodeB at X2 handover.

The list of cells may be linked based on the geographic area they cover. This could be done by including a sector or area reference for each cell or alternatively by grouping the cells per geographic coverage area.

When no X2 or the like setup is applied between eNB neighbors, the same procedure and information exchange between eNBs may apply over S1 for S1 handover purpose.

All cells belonging to the same "area" or sector are listed, i.e. stored, as neighboring cells, if one of the cells in the "area" or sector is stored in the list, such as the white list, or is found by the ANRL function. This is an intra eNB procedure and takes place in any eNB when e.g. white list information is updated or when ANRL function discovers a new neighbor. See for example FIGS. 2 and 3, which schematically describe method steps of the invention according to embodiments thereof described in the foregoing.

A new set of cells, may be signaled for example by first taking down the X2 interface and making a new setup or by using an update message, then the new cells should be checked to determine whether they belong to the same area as old neighbors, i.e. cells.

Inter-RAT cells may also, in an alternative application of the invention, use the same sector as LTE cells, but to adopt the same information/procedure for inter-RAT cells the eNB needs to know these cells even though they are served by another node.

The present invention more specifically relates to a method and a base station, such as NodeB or eNodeB base station, adapted for listing of cells as neighbor cells if found covering the same geographical area as cells of a list of cells served by and stored in a first base station and configured therein as neighbor cells.

Figure 2:
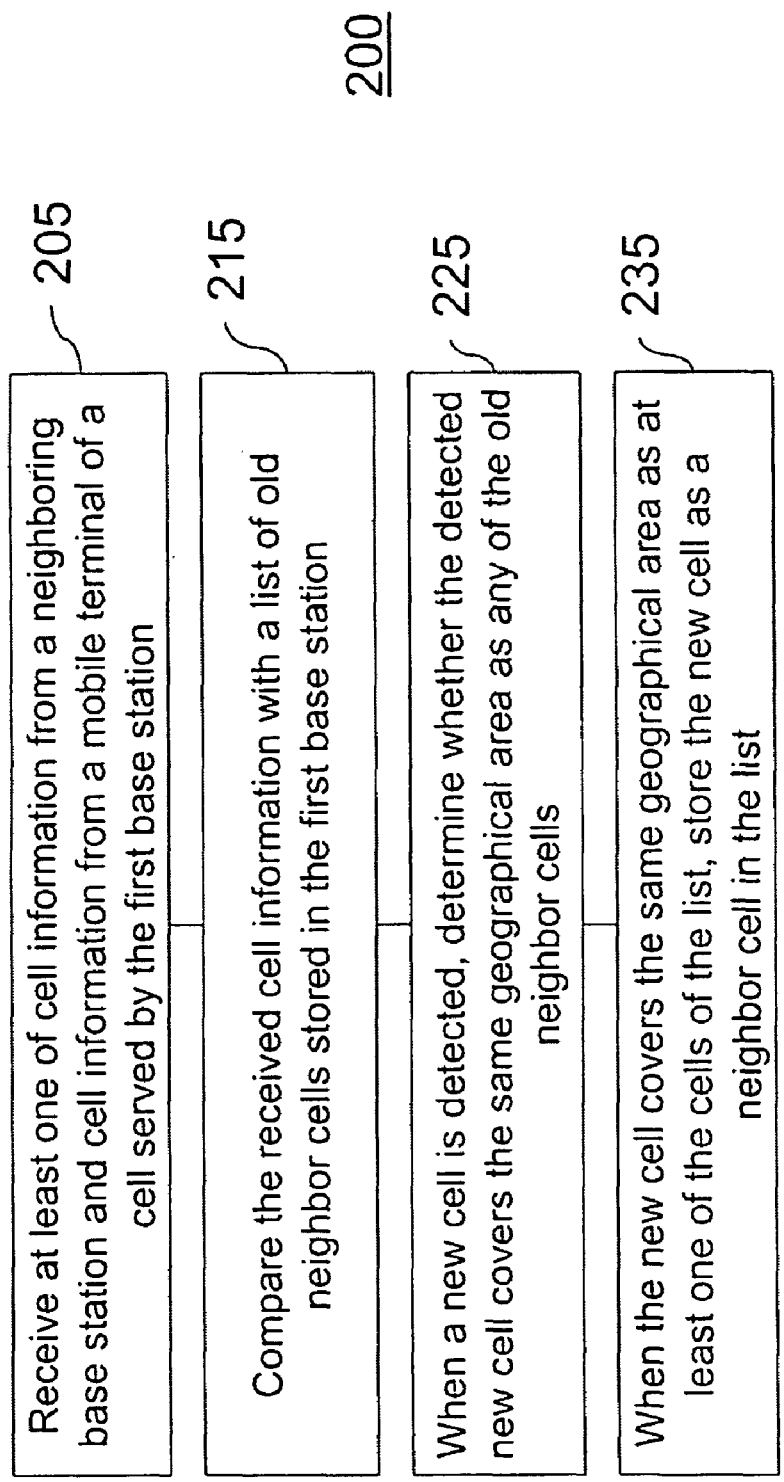
FIG. 2, in a flowchart, schematically illustrates method steps of the invention according to one embodiment.

FIG. 2 illustrates a method 200 for automatically determining neighbor cells according to one embodiment. FIG. 2 begins at step 205. At step 205, at least one of cell information from a neighboring base station and cell information from a mobile terminal of a cell served by the initial base station is received. All cells belonging to the same "area" or sector are listed, i.e. stored, as neighboring cells, if one of the cells in the "area" or sector is stored in the list, such as the white list, or is found by the ANRL function. This is an intra eNB procedure and takes place in any eNB when e.g. white list information is updated or when ANRL function discovers a new neighbor.

At step 210, the received cell information is compared with a list of old neighbor cells stored in the initial base station. At step 215, when a new cell is detected, a determination is made as to whether the detected new cell covers the same geographical area as an of the old neighbor cells. At step 220, when the new cell covers the same geographical area as at least one of the cells of the list, i.e., a so-called old cell, the new cell is stored as a neighbor cell in the list. The neighboring cell information provided by the list is thereby updated in the first base station without having to perform any inter-frequency measurements.

Figure 3:
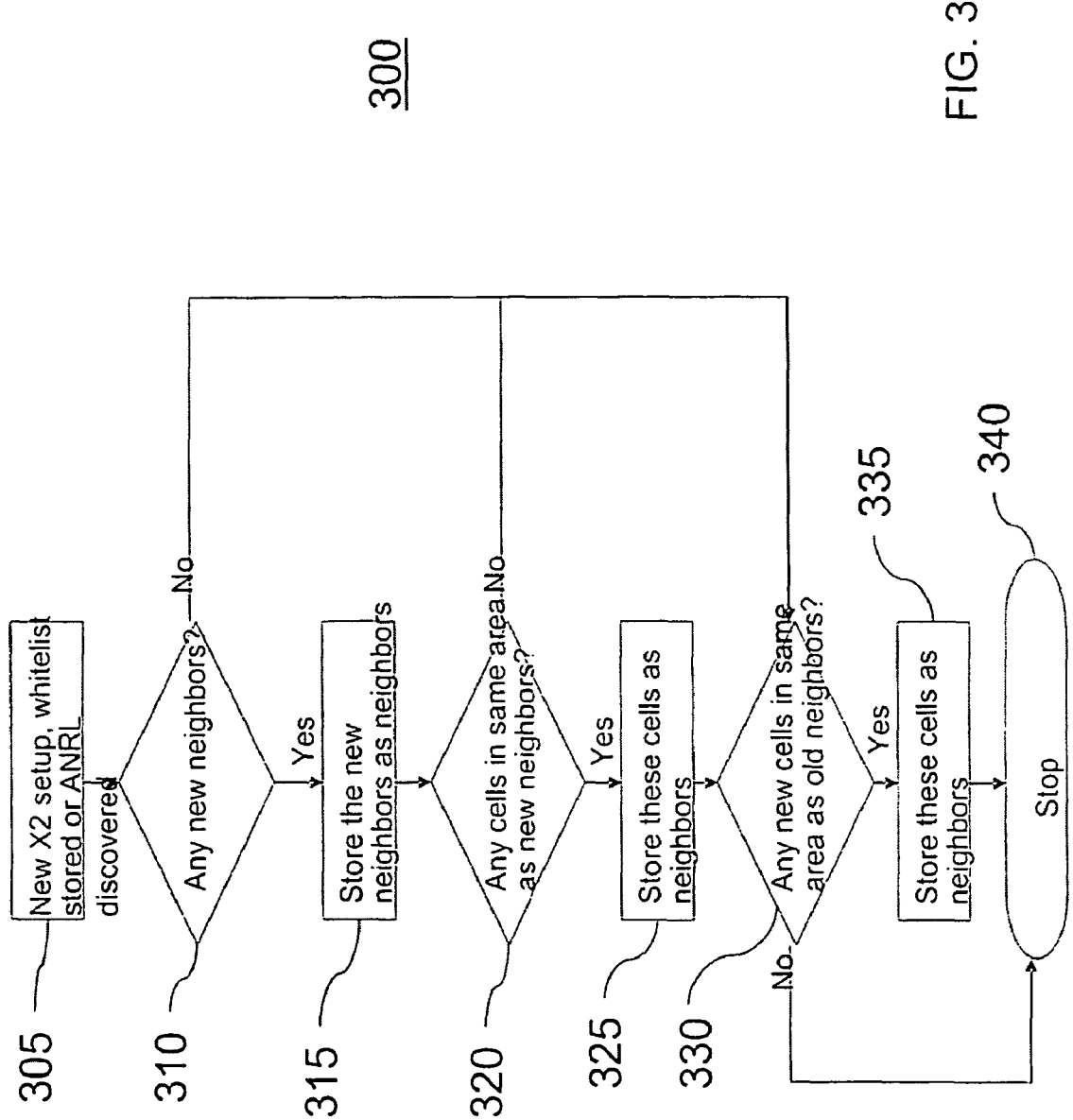
FIG. 3, in a flowchart, schematically illustrates method steps of the invention according to one embodiment.

FIG. 3 illustrates a method 300 for automatically determining neighbor cells according to one embodiment. Method 300 begins at step 305. At step 305, at least one of cell information from a neighboring base station and cell information from a mobile terminal of a cell served by the first base station is received. All cells belonging to the same "area" or sector are listed, i.e. stored, as neighboring cells, if one of the cells in the "area" or sector is stored in the list, such as the white list, or is found by the ANRL function. This is an intra eNB procedure and takes place in any eNB when e.g. white list information is updated or when ANRL function discovers a new neighbor.

At step 310, the received information is checked for new neighbors. In one embodiment, checking for new neighbors comprises comparing the received cell information with a list of neighbor cells stored in the first base station as old neighbor cells and detecting new neighbors based on the comparison. If there are new neighbors, those new neighbors are stored as neighbors at step 315.

At step 320, a determination is made as to whether there are cells in a same geographic area as the new neighbors. If there are cells in the same geographic area as the new neighbors, these cells are stored as neighbors at step 325.

At step 330, a determination is made as to whether there are new cells in a same geographic area as the old neighbor cells. If there are new cells in the same area as old neighbors, these new cells are stored as neighbors at step 335. Method 300 ends at step 340.

Figure 4:
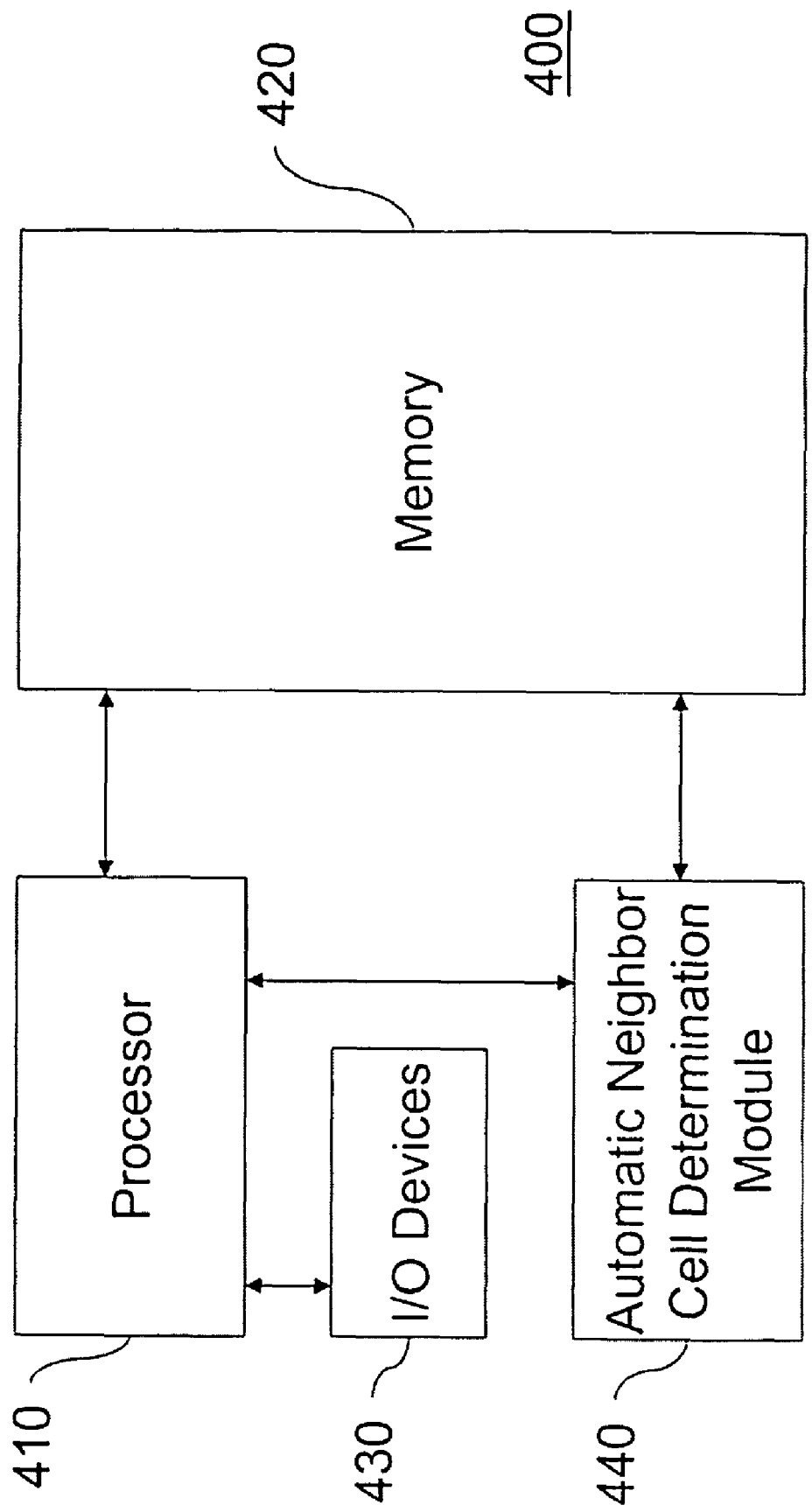
FIG. 4 illustrates a block diagram of a base station according to one embodiment.

FIG. 4 illustrates a block diagram 400 of a base station, e.g. eNodeB, NodeB, of the present invention. Specifically, the base station can be employed to automatically determine neighbor cells. In one embodiment, the base station is implemented using a general purpose computer or any other hardware equivalents.

Thus, the base station, e.g., first base station, comprises a processor (CPU) 410, a memory 420, e.g., random access memory (RAM) and/or read only memory (ROM), automatic neighbor cell determination module 440, and various input/output devices 430 (e.g., storage devices, including but not limited to, a tape drive, a floppy drive, a hard disk drive or a compact disk drive, a receiver, a transmitter, a speaker, A/D and D/A converters).

It should be understood that automatic neighbor cell determination module 440 can be implemented as one or more physical devices that are coupled to the CPU 410 through a communication channel. Alternatively, automatic neighbor cell determination module 440 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 420 of the computer. As such, the automatic neighbor cell determination module 440 (including associated data structures) of the present invention can be stored on a computer readable medium, e.g., RAM memory, magnetic or optical drive or diskette and the like.

An advantage with the present invention is that neighboring cells that cover the same area as an intra-frequency cell discovered by ANRL function can all be listed as neighboring cells automatically, without performing any inter-frequency measurements. Furthermore, only intra-frequency neighbors needs to be configured in the white list for the system, or more specifically base station of the system, to automatically find inter-frequency cells with same coverage area and to store them as neighbors, i.e. neighbor cells, as well.

The herein described method steps of the invention may be implemented by software executed by a processor in a network node, such as a radio base station also called NodeB or eNodeB.

Any examples and terminology relating to 3GPP LTE standard being used herein should not be seen as limiting the scope of the invention, the methodology of which in principle can be applied to any communication system.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method in a first base station for automatically determining neighbor cells, comprising:
receiving at least one of cell information from a neighboring base station and cell information from a mobile terminal of a cell served by the first base station;
comparing the received cell information with a list of old neighbor cells stored in the first base station;
when a new cell is detected,
determining whether the detected new cell covers the same geographical area as any of the old neighbor cells; and
when the new cell covers the same geographical area as at least one of the cells of the list,
storing the new cell as a neighbor cell in the list.

2. The method of claim 1, further comprising:
identifying a new neighbor cell to be stored in the list;
comparing the cell information of the neighboring base station with the cell information of the terminal for detecting new cells, and when a new cell is detected,
determining, based on the comparison, whether the new cell covers the same geographical area as the new neighbor cell of the terminal, and
when the new cell covers the same geographical area as the terminal neighbor cell,
storing both of the new cell and the terminal neighbor cell as a respective neighbor cell in the list.

3. The method of claim 1, further comprising:
identifying a new neighbor cell by terminal;
comparing the cell information of the neighboring base station with the cell information of the terminal for detecting new cells, and when a new cell is detected,
determining, based on the comparison, whether any cell in the cell information of the neighboring base station covers the same geographical area as the new neighbor cell of the terminal, and
store all cells that covers the same geographical area as the terminal neighbor cell, as neighbor cell in the list, including the neighbor cell of the terminal.

4. The method of claim 1, wherein the terminal cell information is provided through an intra-frequency function for detecting new neighbor cells.

5. The method of claim 4, wherein the intra-frequency function comprises an Automatic Neighbor Relation (ANRL) function for detecting new neighbor cells.

6. The method of claim 1, wherein the cell information of the first base station and neighbor base station respectively comprise a list of served cells and at least one of configuration data for each served cell and an area sector reference for each cell.

7. The method of claim 1, wherein the terminal cell information comprises at least one of configuration data and area sector reference for the new neighbor cell identified by the terminal.

8. The method of claim 7, wherein the configuration data comprises at least one of physical layer cell identity, frequency and global cell identity.

9. The method of claim 7, wherein determining of same geographical area involves matching the area sector reference for said new cell with the area sector reference of at least one of the cells of said list or with the area sector reference of said terminal neighbor cell for correspondence.

10. An apparatus of a wireless communication system capable of automatically determining neighbor cells, comprising:
a base station configured to,
receive at least one of cell information from a neighboring base station and cell information from a mobile terminal of a cell served by the first base station;
compare the received cell information with a list of old neighbor cells stored in the first base station;
when a new cell is detected,
determine whether the detected new cell covers the same geographical area as any of the old neighbor cells; and
when the new cell covers the same geographical area as at least one of the cells of the list,
store the new cell as a neighbor cell in the list.

11. A method in a first base station for automatically determining neighbor cells, comprising:
receiving at least one of cell information from a neighboring base station and cell information from a mobile terminal of a cell served by the first base station;
comparing the received cell information with a list of neighbor cells stored in the first base station as old neighbor cells;
detecting new neighbors based on the comparison;
determining whether there are cells in a same geographic area as the new neighbors;
determining whether there are new cells in a same geographic area as the old neighbor cells;
storing the new neighbors, the cells in the same geographic area as the new neighbors, and the new cells as neighbors in the list.

* * * * *